US011169041B2

(12) United States Patent
Hirlekar

(10) Patent No.: US 11,169,041 B2
(45) Date of Patent: Nov. 9, 2021

(54) DIFFERENTIAL PRESSURE INDICATING DEVICE

(71) Applicant: Gaurav Hirlekar, Pune (IN)

(72) Inventor: Gaurav Hirlekar, Pune (IN)

( * ) Notice: Subject to any disclaimer, the term of this patent is extended or adjusted under 35 U.S.C. 154(b) by 334 days.

(21) Appl. No.: 16/345,221

(22) PCT Filed: Jul. 7, 2018

(86) PCT No.: PCT/IN2018/050471
§ 371 (c)(1),
(2) Date: Apr. 25, 2019

(87) PCT Pub. No.: WO2019/180729
PCT Pub. Date: Sep. 26, 2019

(65) Prior Publication Data
US 2021/0310888 A1 Oct. 7, 2021

(30) Foreign Application Priority Data
Mar. 21, 2018 (IN) .............................. 201821010348

(51) Int. Cl.
*G01L 13/02* (2006.01)
*G01D 5/06* (2006.01)
(Continued)

(52) U.S. Cl.
CPC .............. *G01L 13/025* (2013.01); *G01D 5/06* (2013.01); *G01L 7/10* (2013.01); *G01L 13/02* (2013.01); *G01L 19/16* (2013.01)

(58) Field of Classification Search
CPC . G01L 13/02; G01L 19/16; G01L 7/10; G01L 13/025; G01D 5/06
See application file for complete search history.

(56) References Cited

U.S. PATENT DOCUMENTS 2,100,706 A * 11/1937 Wunsch .................. G01L 19/08
73/387
3,283,584 A * 11/1966 Coffing ................... G01L 7/166
73/744
(Continued)

FOREIGN PATENT DOCUMENTS

CN 2800254 Y * 7/2006

OTHER PUBLICATIONS

International Search Report and Written Opinion dated, Nov. 28, 2018, in International Patent Application No. PCT/IN2018/050471 filed Jul. 20, 2018.

*Primary Examiner* — Ryan D Walsh
(74) *Attorney, Agent, or Firm* — Wiley Rein LLP

(57) ABSTRACT

A differential pressure indicator includes a multi-polar driving magnets train clamped on a piston pin that moves in response to the changes in pressure conditions, thereby driving a multi-polar follower magnet carrying an indicating member, to move across a scale for a total angular range of 90° to 270°. The exact angular displacement of the follower magnet per unit linear displacement of the driving magnets train is decided by varying the relative magnetic strengths of the driving and follower magnets or by varying the spacing between adjacent magnets of the driving magnetic train. Further, magnetic flux of an auxiliary magnet fitted on the piston pin at a 90° orientation relative to the driving magnet train is utilized for actuating a magnetic switch in the switch assembly.

4 Claims, 7 Drawing Sheets

(51) Int. Cl.
*G01L 19/16* (2006.01)
*G01L 7/10* (2006.01)

(56) References Cited

U.S. PATENT DOCUMENTS

| | | |
|---|---|---|
| 3,429,291 A | 2/1969 | Hoffman |
| 3,998,179 A * | 12/1976 | Dieterich .............. G01D 5/04 73/866.1 |
| 4,416,211 A | 11/1983 | Hoffman |
| 2008/0148807 A1 * | 6/2008 | Berry .............. G01L 19/0038 73/1.57 |
| 2008/0289567 A1 | 11/2008 | Gordon |

* cited by examiner

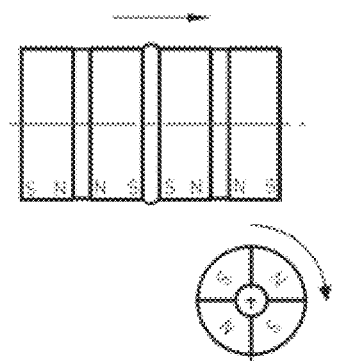
Figure 9.1
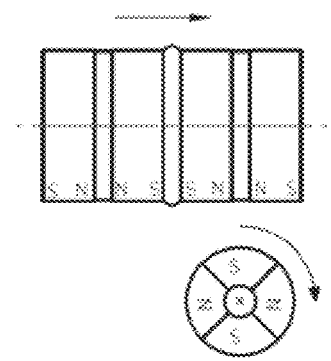
Figure 9.2
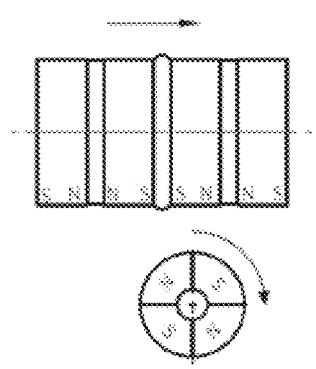
Figure 9.3
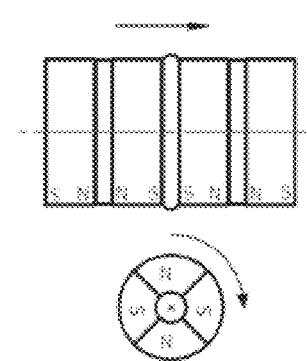
Figure 9.4

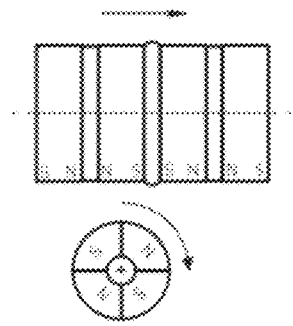
Figure 9.5
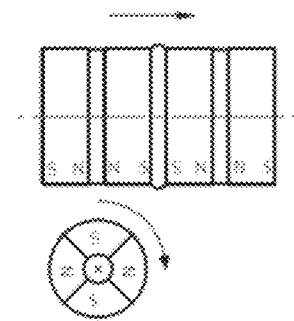
Figure 9.6
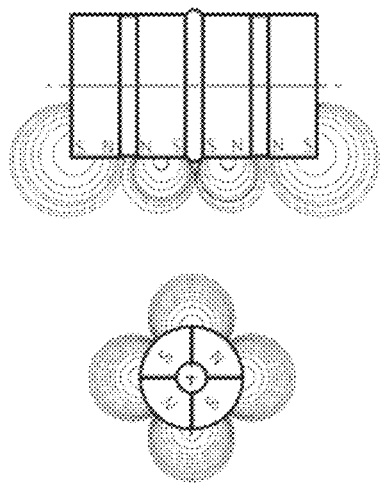
Figure 9.7
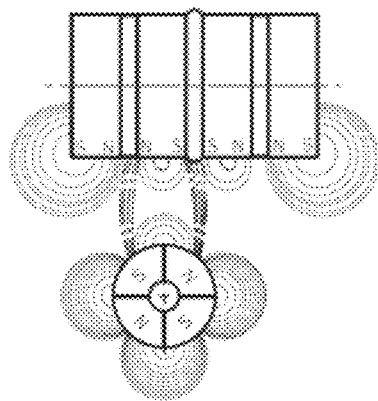
Figure 9.8

DIFFERENTIAL PRESSURE INDICATING DEVICE

CROSS-REFERENCE TO RELATED APPLICATION(S)

This is a United States National Stage Patent Application that relies for and claims priority to International Patent Application No. PCT/IN2018/050471, filed on Jul. 20, 2018, and Indian Patent Application No. 201821010348, filed on Mar. 21, 2018, the entire contents of both of which are incorporated herein by reference.

FIELD OF THE INVENTION

The present invention relates to a differential pressure indicating device and more particularly it relates to a multi polar magnetic coupling mechanism of a differential pressure indicator having 270° angular range of an indicating pointer.

BACKGROUND OF THE INVENTION

Normally the differential pressure indicator is a device intended to measure differential pressures for gas, liquids such as water, or other chemical substances, etc., that is, differences in pressure for instance between two fluid lines that are intended to be connected to opposite ports of the indicator. U.S. Pat. No. 3,429,291 discloses a differential indicator comprising a scale on dial, a pointer carried by pivot pin, follower magnet mounted on pivot pin and a driving magnet train with a single N and S pole mounted on piston pin sub assembly. The magnet train is movable with piston pin and like. Another similar application U.S. Pat. No. 4,416,211 discloses an indicator device with calibration means. The construction disclosed in above patents has found important use for many years and has provided a very satisfactory performance over this period of time.

While coming to the short comings of differential pressure gauges employing magnetic coupling, the 90° range of rotation of the follower magnet that moves the indicator is unsuitable for indicating a variety of differential pressure ranges on the same dial, especially when multiple scales of differing differential pressure ranges are to be shown on a single gauge. A three scale differential pressure gauge required by the cryogenic tank industry is a particularly relevant example wherein the indicating pointer must traverse a 270° angular range for the smallest differential pressure scale to have an angular range equal to 90°.

Secondly, incorporating a driving magnet that travels out of the range of the follower magnet results in a wide variation in coupling strength between the magnets at various positions of the driving magnet. This reduction in magnetic coupling prevents further transference of linear motion from the driving magnet to the rotary motion of the follower magnet outside a small angular displacement. Equally significantly, a reduction in magnetic coupling strength reduces the resistance of the follower magnet to vibration that the indicator may be subjected to, resulting in an oscillatory behavior of the indicating pointer, making the device difficult to read. This is especially a problem when installed in mobile applications. A final problem associated with a weak magnetic coupling is the tendency of the follower magnet to jump 180° on being driven by an impact force instead of the magnetic force of the driving magnet. This results in the indicator having to be opened and the follower magnet manually rotated back to its original position to restore the indicator to working condition.

Thirdly, due to the weak magnetic coupling at the extreme positions and stronger at the center position, the sensitivity of the instrument, i.e., the angular displacement per unit of differential pressure varies widely as a function of the magnet position. This makes the scale markings crowded at the center and sparse at the edges, thereby making the device difficult to read.

Despite an obvious need in the differential pressure indicator market for a 270° indicator, no successful breakthrough has been made toward this direction in the fifty years since the filing of U.S. Pat. No. 3,429,291. Keeping the construction as described in U.S. Pat. No. 3,429,291 and simply extending the sliding range of the piston pin was found to be ineffective in extending the angular range of the follower magnet due to a rapid drop-off in magnetic coupling strength beyond a particular distance from the center position of the piston assembly. The second approach of adding permanent magnets in the piston pin was also unsuccessful in the case when the magnets were clamped together with dissimilar poles of adjacent magnets facing each other. When the magnetic train was constructed with magnets clamped together with similar poles of adjacent magnets facing each other without the use of spacers in between adjacent magnets, the angular range of the follower magnet showed a marked increase. However, there was created a large variation in the coupling strength between the driving magnet and the follower magnet resulting in a highly nonlinear dial with alternating crowded and sparse regions of markings. It was found that the variation in coupling ratio is highly dependent on the uniformity of the magnetic strengths of adjacent magnets in the magnetic train. If magnets in the driving magnet train are not well matched in strength, there is a variation in the coupling ratio in the zone where multiple magnetic poles on the piston pin are meshed with multiple poles in the follower magnet. This results in non-uniform marking spacing on the printed dial. Accordingly, there exists a need to provide that can overcome the drawbacks in the prior art.

SUMMARY OF THE INVENTION

An object of the present invention is to provide a differential pressure indicator having 90° to 270° angular range of the indicating pointer.

Another object of the present invention is to provide a coupling for a differential pressure indicator that eliminates the possibility of stalling phenomenon.

Still another object of the present invention is to provide a coupling to a differential pressure indicator that improves the robustness of the indicator to any vibrations it may be subjected to.

Still another object of the present invention is to provide a differential pressure indicator that can measure the crossing of a threshold value by a measured parameter or sense the value of the measured parameter within sufficiently small increments.

Yet another objective of the present invention is to increase the uniformity of the magnetic coupling so as to reduce a variation in the sensitivity of the device.

The present invention discloses a differential pressure indicator incorporating multi polar magnetic coupling mechanism and having 90° to 270° angular range of the indicating pointer. The differential pressure indicator of present invention comprises of a high pressure compartment and low pressure compartment sealed together with a rubber diaphragm between them. The rubber diaphragm receives differential pressure fluid on either faces thereof. The movement of diaphragm due to differential pressure is coupled with a piston pin having a train of driving magnets clamped thereon. The ring magnets of the train are axially magnetized, clamped on the piston pin with similar poles of adjacent driving magnets facing each other, and they are separated by a spacer. Moving diaphragm induces a linear movement in the piston pin. A diametrically charged follower magnet pivotally fitted in a dial assembly and connected to the pin indicator of dial assembly is magnetically coupled with the driving magnet train in such a way that linear motion of driving magnetic train induces angular motion in the follower magnet. The angular motion of the follower magnet within a linear range is decided by the number and width of magnets in the driving magnet train and spacing between them. The exact angular displacement of the follower magnet per unit linear displacement of the driving magnet is decided by varying the relative magnetic strengths of the driving and follower magnets. Further, an auxiliary magnet is installed in a slot machined in the piston assembly to which the driving magnet train is attached. This auxiliary magnet is installed at a 90° orientation relative to the driving magnet train and at a distance sufficiently large so as to cause no disturbance to its operation. The magnetic flux of this auxiliary magnet passes through a reed switch or a hall sensor installed within a switch box on the body of the indicating device, and a calibrated position of the piston assembly causes enough magnetic force to close the reed switch or trigger the hall switch. Unlike the prior art, in which the driving magnet itself is used to actuate the reed switch an auxiliary magnet is required in this invention due to the multi polar construction of the driving magnet causing multiple switch openings and closures within a single end-to-end motion of the driving magnet.

This specific construction of driving and follower magnets is a magnetic analogue to a mechanical rack and pinion joint, such that any sliding motion of the driving magnet causes a corresponding angular motion of the follower magnet within a linear range decided by the number and width of magnets in the driving magnet train. By causing cogging between multiple linear magnetic poles on the driving magnet and corresponding angular poles in the follower magnet, the deficiencies in the prior art are overcome, that both, constrain it to a small range of approximately 90° range of motion of the follower magnet and also cause a variation in the strength of the magnetic coupling. The range of motion of the follower magnet in present invention is virtually unbounded and limited only by the number of magnetic poles in the driving magnet. Furthermore, by varying the relative magnetic strengths of the driving and follower magnets, the exact angular displacement of the follower magnet per unit linear displacement of the driving magnet is adjusted. These two desirable properties therefore allow it use in many more applications than the one presently listed in this invention.

BRIEF DESCRIPTION OF THE DRAWINGS

The objects and advantages of the present invention will become apparent when the disclosure is read in conjunction with the following figures, wherein

FIGS. 9.1 to 9.8 show a schematic of driving magnets and a follower magnet employed in a differential pressure indicator in accordance with the present invention.

DETAILED DESCRIPTION OF THE EMBODIMENTS

Figures 1, 2:
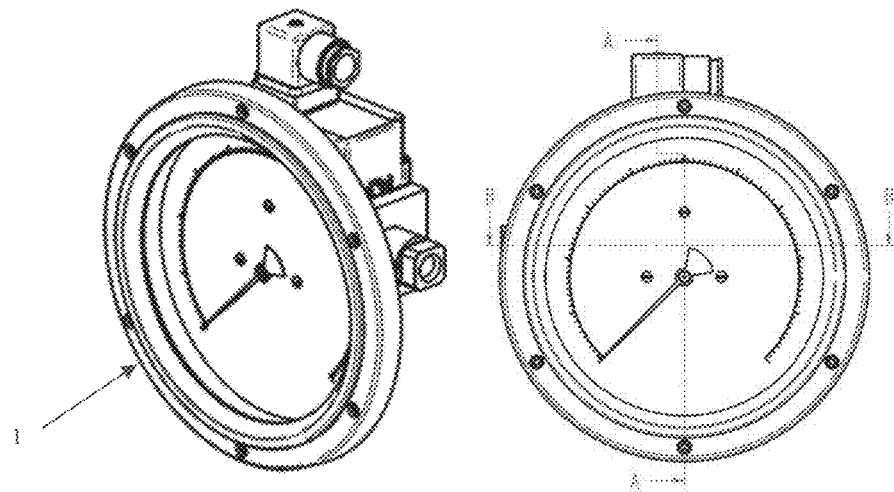
FIG. 1 shows a perspective view of a differential pressure indicator in accordance with the invention.
FIG. 2 shows a front view of a differential pressure indicator in accordance with the present invention.

The foregoing objects of the invention are accomplished and the problems and shortcomings associated with prior art techniques and approaches are overcome by the present invention described in the present embodiments.

The present invention provides a differential pressure indicator with a magnetic coupling mechanism for having 90° to 270° angular range of the indicating member. The device comprises of a first split half and a second split half containing one half of a machined cavity and are sealed together with a rubber diaphragm between them and a piston pin assembly fitted in the cavity. A driving magnetic train having plurality of ring magnets with similar poles facing each other and separated by spacers is clamped on the piston pin. The rubber diaphragm receives differential pressure fluid on either of its surfaces and moves the piston pin assembly against a spring. A ring magnet magnetically coupled to the driving magnetic chain is pivotally fitted on the second split half in such a way that the linear movement of the piston pin induces angular movement in the ring magnet. An indicating member of the dial assembly fitted on the second split half is connected to the follower ring magnet. The arrangement of magnets in the driving magnets train forms a multi-polar driving magnet train moving in response to changes in pressure conditions, thereby driving the follower magnet carrying the indicating member to move across a scale for a total angular range of 90° to 270°, wherein the exact angular displacement of the follower magnet per unit linear displacement of the driving magnet is decided by varying the relative magnetic strengths of the driving and follower magnets or by varying the spacing between adjacent magnets of the driving magnetic train. Further, magnetic flux of an auxiliary magnet fitted on the piston pin at a 90° orientation relative to the driving magnet train is utilized for actuating a reed switch or a hall sensor in the switch assembly fitted on the second split half.

The present invention is illustrated with reference to the accompanying drawings, throughout which reference numbers indicate corresponding parts in the various figures. These reference numbers are shown in bracket in the following description and in the table below.

TABLE

| Ref No: | Component | Ref No: | Component |
|---|---|---|---|
| 100 | Differential pressure indicator | 33 | support washer |
| 1 | Dial assembly | 36 | plastic cover |
| 2 | triangular sealing rubber piece | 37 | plastic window |
| 3, 10, 15, 34 | O-rings | 38 | Indicating member |
| 4 | bearing cap | 39 | Dial screws |
| 5 | Pointer pin | 40 | Dial plate |
| 6 | Follower magnet | 41 | Rubber gasket |
| 7 | pivot bush | 42 | Dial housing |
| 8 | adjustable grub screw | 43 | sealing gasket |
| 9 | second pressure port | 44 | Terminal wire strip |
| 11, 25 | Spacers | 45 | O-ring |
| 12 | Compression spring | 46 | Washer |
| 13 | Second split half | 47 | Range screw |
| 14 | switch box assembly | 48 | Rubber washer |
| 16 | piston pin assembly | 49 | Switch cover |
| 17 | First split half | 35, 50 | screws |
| 18, 19 | Screw and washer | 51 | sealing gasket 2 |
| 20 | First pressure port | 52 | DIN connector base |
| 21 | screw joint | 53, 56 | threaded screws |
| 22 | spring guide cup | 54 | Gasket |
| 23, 26 | guide washers | 55 | DIN connector head |
| 24 | Driving magnets | 57 | Nuts |
| 27 | auxiliary magnet | 58 | Tube |
| 28 | guide | 59 | Magnetic switch |
| 29 | piston pin | 60 | Molded cap |
| 30 | Threaded screw joint | 61 | Circlip |
| 31 | diaphragm guide cup | 62 | Cylindrical bore |
| 32 | diaphragm | 63 | Stepped bore |

Figures 3, 4:
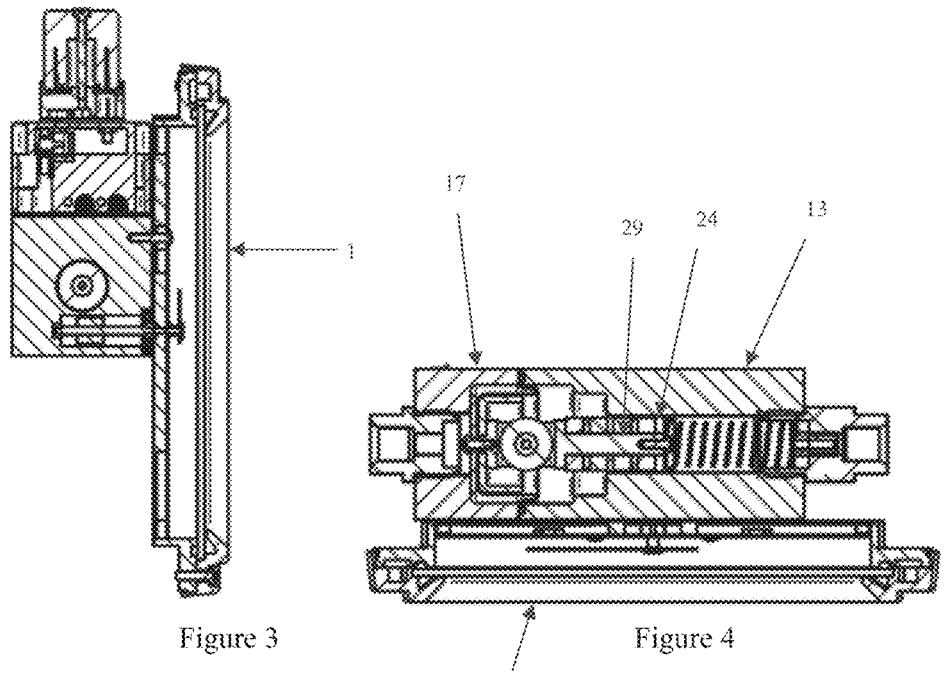
FIG. 3 shows a cut sections along the sections A-A of FIG. 2 a differential pressure indicator in accordance with the invention.
FIG. 4 shows a cut sections along the sections B-B of FIG. 2 a differential pressure indicator in accordance with the invention.
Figure 5:
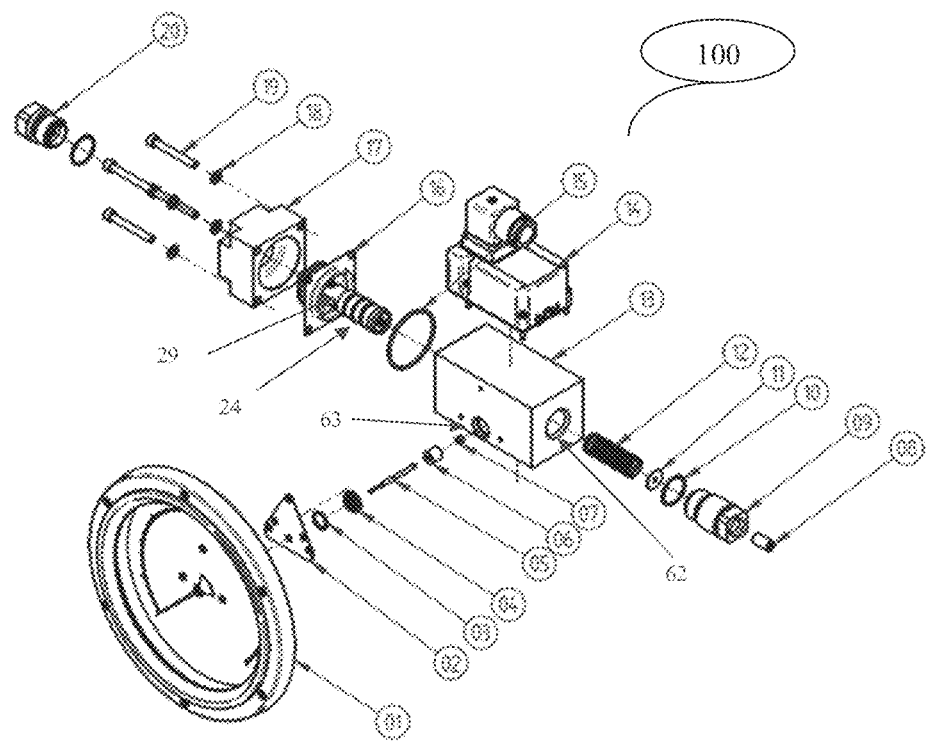
FIG. 5 shows an exploded view of the magnetic coupling mechanism for a differential pressure indicator in accordance with the invention.
Figure 6:
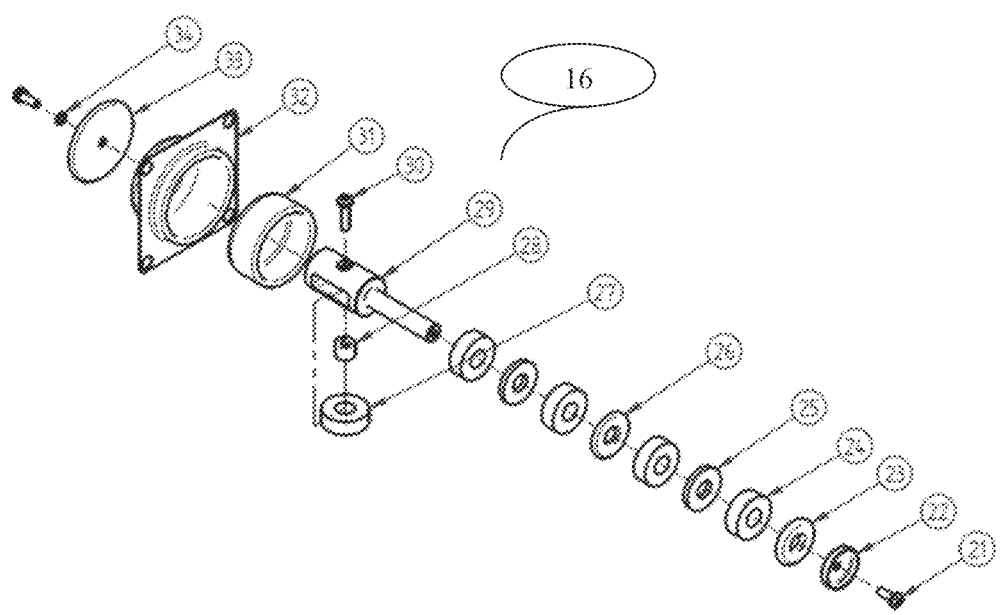
FIG. 6 shows an exploded view of the piston pin assembly of a differential pressure indicator in accordance with the invention.
Figure 7:
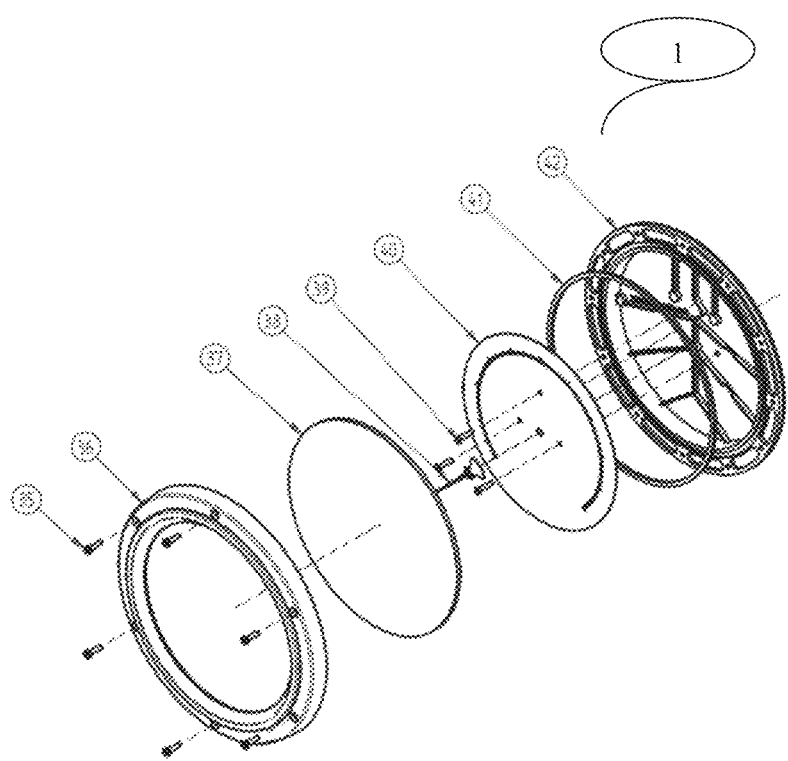
FIG. 7 shows an exploded view of the dial housing assembly of a differential pressure indicator in accordance with the invention.
Figure 8:
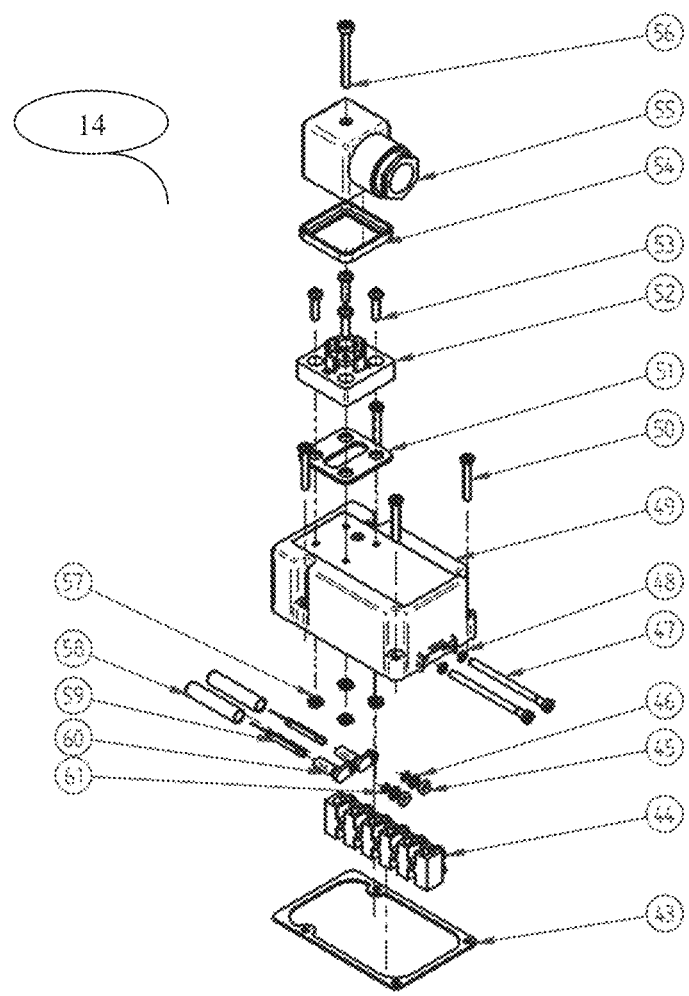
FIG. 8 shows an exploded view of the switch box assembly of a differential pressure indicator in accordance with the invention.

Referring to the FIGS. 1 to 9 a differential pressure indicating device (100) (herein after referred to as "the device (100)") in accordance with the present invention is shown. The device (100) comprises of a first split half (17), a second split half (13), a piston assembly (16), a dial assembly (1) and a switch assembly (14).

The first split half (17) and the second split half (13) contain one half of a machined cavity and are sealed together with the piston assembly (16) fitted therein and a rubber diaphragm (32) fitted there between. The clamping force for fitting the two split halves together is provided by four threaded screw joints each comprising a screw (19) and a washer (18). The second split half (13) is configured with a cylindrical bore (62) machined through the length thereof, a stepped bore (63) and three threaded holes on the front face thereof. The sliding motion of the piston pin assembly (16) is guided through the cylindrical bore (62)

The first split half (17) receives a fluid at higher pressure through a first pressure port (20) while the second split half (13) receives fluid at lower pressure through a second pressure port (9). The rubber diaphragm (32) receives differential fluid pressure on either faces of it through the first and second pressure ports (9 & 20).

The piston pin assembly (16) comprises of a piston pin (29) cylindrical in shape and configured with a turned projecting surface at one end and a slot at the middle. The turned projecting end of the piston pin (29) holds a driving magnets train (24) in which a plurality of axially magnetized ring magnets are arranged with the similar poles of adjacent magnets facing each other and separated by a plurality of spacers (25) between them. The driving magnets train (24) is guided and clamped together by means of a spring guide cup (22) and a screw joint (21). A pair of Teflon guide washers (23 & 26) helps to guide the sliding motion of the piston pin (29) in the cylindrical bore (62) with minimum frictional resistance. A diaphragm guide cup is installed on the other side of the piston pin (29) on which rests the rubber diaphragm (32) clamped together by means of a support washer (33) and an O-ring (34) to prevent migration of the fluid from the first split half (17) to the second split half (13). The diaphragm (32) converts the applied differential pressure into a force on the piston pin assembly (16) which moves against a compression spring (12). The compression spring (12) is held between the spring guide cup (22) on one side and threaded end-cap of the second pressure port (9) on the other side. One or more spacers (11) of various thicknesses are used for a rough adjustment of the spring preload while the precise adjustment is done by twisting the adjustable grub screw (8) on threaded end-cap of second pressure port (9). Two O-rings ensure effective sealing of the bore (62) and prevent leakage of the fluid to the outside of the device. The movement of the driving magnets train (24) along with the spring (12) is constrained within a region by threaded end caps to only a sliding axial motion in the bore (62) to provide a return force on elimination of the pressure differential.

An auxiliary magnet (27) is installed in the middle slot of the piston pin (29) at 90° orientation relative to the driving magnets train (24), by means of a guide (28) and a threaded screw joint (30). The auxiliary magnet (27) is installed at a distance sufficiently large so as to cause no disturbance to the operation of the driving magnets train (24).

The dial assembly (1) is fitted on the second split half (13) by means of three dial screws (39). The dial assembly (1) comprises of a glass or plastic window (37) and a rubber gasket (41) clamped together between a plastic cover (36) and a plastic dial housing (42) by means of six screws (35). An O-ring (3) and triangular sealing rubber piece (2) are sandwiched between the dial assembly (1) and the second split half (13) to prevent the passage of fluid into and out of the dial assembly (1).

A follower magnet (6) is installed in the stepped bore (63), in such a way that any sliding motion of the driving magnet train (24) causes a corresponding angular motion of the follower magnet (6) within a linear range decided by the number and width of magnets in the driving magnets train (24). The individual ring magnet in the driving magnets train (24) is axially magnetized, while the follower magnet (6) is diametrically magnetized ring magnet having a minimum of four magnetic poles. Here the driving magnets (24) and the follower magnet (6) together provide the required magnetic coupling for the dial assembly (1). The construction of the driving magnet (24) and follower magnets (6) is a magnetic analogue to a mechanical rack and pinion joint. The range of motion of the follower magnet (6) in the device (100) is virtually unbounded and limited only by the number of magnetic poles of the driving magnets (24). Thus the angular displacement of the follower magnet (6) per unit linear displacement of the driving magnets train (24) is adjustable by varying the relative magnetic strengths of the driving magnets (24) and follower ring magnet (6).

The driving magnets train (24) is having a magnetic strength larger than the follower magnet (6). This causes the magnetic field to shifts towards the follower magnet (6) and increases the mean coupling ratio of the joint. In the embodiment, the width of the magnetic pole of each magnet in driving magnetic train (24) is kept equal to the arc length of the arc of angular width equal to that of any magnetic pole on the follower magnet (6) that is acting at a distance equal to that of the effective interaction point of the magnetic fields from the center of the follower magnet (6).

This is done by placing the spacers (25) in between the individual driving magnets (24) and to create magnetic poles of necessary width, as shown in FIG. 9.8.

The follower magnet (6) is attached to a pointer pin (5) and suspended between a pivot bush (7) and a bearing cap (4). The pointer pin (5) protrudes through the corresponding hole in the dial assembly (1). In the dial assembly (1), an indicating member (38) is fitted to the pointer pin (5) by means of a mechanical friction joint that allows for zeroing of the indicator device independently of the magnetic interactions. The indicating member (38) sweeps over a dial plate (40), on which are printed calibrated markings and numerals corresponding to specific values of the measured parameter. The indicating pointer (38) slides through a total angular range of 90° to 270°, across the dial plate (40).

The switch box assembly (14) comprises of a plastic molded switch cover (49) with four holes on the top for mounting a DIN connector base (52) through a sealing gasket (51) by means of four threaded screws (53) and four nuts (57). The switch box assembly (14) is secured to the top of the second split half (13) by means of four screws (50) projecting through the switch cover (49) and the sealing gasket (43) to protect the switch cover (49) from fluid ingress. A DIN connector head (55) is attached to the connector base (52) by means of a threaded screw (56) along with a gasket (54) to keep liquids from entering the connector. Inside the molded switch cover (49) are the adjustable reed switch assemblies each comprising of a plastic molded cap (60) with a threaded hole and a tube (58) into which a reed switch (59) is glued in place. Flying leads of a reed switch (59) are soldered to the metallic terminals of the DIN connector base (52) by means of a lead free solder joint. The cap (60) is threaded onto the range screw (47) which causes the cap to move linearly when the range screw is rotated. To prevent over-range travel of the cap a circlip (61) and a washer (46) are provided. An O-ring (45) on the inside of the switch cover and a rubber washer (48) on the outside together prevent fluid from entering the switch cover while allowing the range screw (47) to rotate in place.

The auxiliary magnet (27) triggers the reed switch (59) at a particular position of driving magnets (24). The magnetic flux of this auxiliary magnet (27) passes through the reed switch (59), and a calibrated position of the piston pin assembly (16) causes enough magnetic force to close the reed switch (59). In the alternate embodiment, the linear hall sensor is used to calibrate the exact value of the magnetic flux of the auxiliary magnet (27) to the value of the measured parameter. The linear hall sensor senses the value of the measured parameter within sufficiently small increments, and signals it to a remote location by means of voltage or current signaling through wires or radio waves.

One or More Advantages of the Invention

1. The device is robust to any vibrations it may be subjected to.
2. Reduced variations in the sensitivity
3. The mechanism provides a strong and uniform magnetic coupling allowing a 90° to 270° range of motion of the indicating pointer without any stall position of the follower magnet.
4. By arranging the combination of follower magnet (6) and the plurality of driving magnets (24), the magnetic coupling facilitates a 270° angular displacement in the follower magnet without any variations in the coupling ratio especially at the 90° and 180° pole change point.
5. The device provides an increase in uniformity of the magnetic coupling so as to reduce the variation in the sensitivity of the device. Reducing this variation prevents alternate crowding and spacing in the markings on the dial scale resulting in a functionally superior and aesthetically pleasing dial scale.
6. A separate auxiliary magnet is provided to actuate the reed switch.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

I claim:

1. A differential pressure indicating device having 90° to 270° angular range of an indicating pointer, the differential pressure indicating device comprising:
    a first split half configured with a machined cavity therein and receiving a fluid at higher pressure through a first pressure port;
    a second split half sealingly fitted to the a first split half with a rubber diaphragm there between, the second split half receiving a fluid at lower pressure through a second pressure port and configured with a cylindrical bore machined through the length thereof and a stepped bore on a frontal half thereof, wherein the rubber diaphragm receives differential fluid pressure on either faces thereof;
    a piston pin assembly comprising a cylindrical piston pin slidingly fitted in the cylindrical bore and moving linearly in response to changes in pressure conditions on the rubber diaphragm against a compression spring held between a spring guide cup and an end-cap on second pressure port; wherein
        the piston pin is configured with a turned projection surface at one side and a slot on circular face thereof;
        a plurality of driving magnets having similar poles of adjacent magnets facing each other and adjacent magnets separated by spacers are clamped on the turned projecting surface forming a driving magnets train guided by the spring guide cup; and
        an auxiliary magnet is fitted in the slot on circular face of piston pin at 90° orientation relative to the driving magnets train;
    a dial assembly sealingly fitted on the second split half and comprising an indicating pointer sliding through a total angular range of 90° to 270°, across a dial plate, a follower magnet pivotally installed in the stepped bore and connected to a pointer pin protruding through the corresponding hole in the dial assembly and connecting with the indicating member by means of a mechanical friction joint that allows for zeroing of the indicator device independently of the magnetic interactions, wherein any sliding motion of the driving magnet train causes a corresponding angular motion of the follower magnet within a linear range decided by the number and width of magnets in the driving magnets train; and a switch box assembly secured on the second split half and comprising of an adjustable magnetic switch wherein at a calibrated position of the piston pin assembly, the magnetic flux of auxiliary magnet passes through the magnetic switch thereby actuating the magnetic switch;

characterized in that, arrangement of magnets in the driving magnets train forms a multi-polar driving magnet train moving in response to changes in pressure conditions, thereby driving the follower magnet and causing the indicating member to move across a scale for a total angular range of 90° to 270°, wherein the exact angular displacement of the follower magnet per unit linear displacement of the driving magnet is decided by varying any one parameter selected from: the relative magnetic strengths of the driving and follower magnets, and the spacing between adjacent magnets of the driving magnetic train.

2. The differential pressure indicating device as claimed in claim 1, wherein each driving magnet from the driving magnets train is an axially magnetized ring magnet.

3. The differential pressure indicating device as claimed in claim 1, wherein the follower magnet is a diametrically magnetized ring magnet having at least four magnetic poles.

4. The differential pressure indicating device as claimed in claim 1, wherein the magnetic switch is any one selected from a reed switch and a linear hall sensor.

\* \* \* \* \*